US012670633B2

(12) United States Patent　　(10) Patent No.:　US 12,670,633 B2
Kalidindi　　(45) Date of Patent:　Jun. 30, 2026

(54) IMAGE OPTIMIZATIONS FOR MODERN WEB

(71) Applicant: Capital One Services, LLC, McLean, VA (US)

(72) Inventor: Ravi Kalidindi, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 141 days.

(21) Appl. No.: 18/374,525

(22) Filed: Sep. 28, 2023

(65) Prior Publication Data

US 2025/0111549 A1　　Apr. 3, 2025

(51) Int. Cl.
| | |
|---|---|
| *G06T 11/00* | (2026.01) |
| *G06F 16/435* | (2019.01) |
| *G06T 3/40* | (2024.01) |

(52) U.S. Cl.
CPC ............ *G06T 11/00* (2013.01); *G06F 16/435* (2019.01); *G06T 3/40* (2013.01); *G06T 2200/16* (2013.01); *G06T 2210/32* (2013.01)

(58) Field of Classification Search
CPC ....... G06T 11/00; G06T 3/40; G06T 2200/16; G06T 2210/32; G06F 16/435
USPC ........................................................ 345/660
See application file for complete search history.

(56) References Cited

U.S. PATENT DOCUMENTS

| | | | | |
|---|---|---|---|---|
| 8,566,297 | B1 * | 10/2013 | Dowers, II | ............ G06F 16/113 |
| | | | | 707/703 |
| 2002/0107988 | A1 | 8/2002 | Jordan | |

| | | | | |
|---|---|---|---|---|
| 2010/0257569 | A1 * | 10/2010 | O'Hanlon | ........ H04N 21/64322 |
| | | | | 725/110 |
| 2010/0312821 | A1 | 12/2010 | Bannoura et al. | |
| 2013/0097488 | A1 | 4/2013 | Coman et al. | |
| 2013/0318197 | A1 | 11/2013 | Plaisted et al. | |
| 2014/0012898 | A1 | 1/2014 | Mittal | |
| 2015/0052193 | A1 * | 2/2015 | Farrell | ............... H04N 21/4402 |
| | | | | 709/203 |
| 2019/0213342 | A1 * | 7/2019 | Acharya | ............... H04L 9/0863 |
| 2020/0204655 | A1 * | 6/2020 | Khalid | .................... H04L 65/80 |

(Continued)

OTHER PUBLICATIONS

Wei-Ying Ma, Ilja Bedner, Grace Chang, Allan Kuchinsky, Hongjiang Zhang, Framework for adaptive content delivery in heterogeneous network environments, Proc. SPIE 3969, Multimedia Computing and Networking, Dec. 27, 1999, Sections 3-7.

*Primary Examiner* — David T Welch

(74) *Attorney, Agent, or Firm* — Sterne, Kessler, Goldstein & Fox P.L.L.C.

(57)　　　　　ABSTRACT

A method includes receiving, from a client device, an original user request to retrieve media content from a server, determining one or more media formats supported by the client device, identifying a formatted media content corresponding to a media format of the one or more media formats supported by the client device, generating a modified user request based on augmenting the original user request to include the formatted media content, and receiving, from the server, a response to the modified user request. In response to determining the response includes an error, the original user request is reconstructed, media content is retrieved from the media server using the reconstructed original user request, the retrieved media content is converted to one of the media formats supported by the client device, and the converted media content is sent to the client device.

20 Claims, 5 Drawing Sheets

(56)            References Cited

U.S. PATENT DOCUMENTS

2021/0382610 A1 * 12/2021 Prasad ................ G06F 3/04886
2024/0089467 A1 * 3/2024 Keen Zamoshchik ......................
                                                        H04N 19/17
2025/0060961 A1 * 2/2025 Woodward, Jr. .... G06F 11/3688

* cited by examiner

100

300

Receive original user request    310

Determine media format(s) supported by client device    320

Identify formatted media content    330

Generate modified user request    340

Receive response from server    350

400

500

Processor 504

Main Memory 508

User Input/Output
Interface(s) 502

User Input/Output
Device(s) 503

Communication
Infrastructure
506

Secondary Memory 510

Hard Disk Drive
512

Removable
Storage Drive
514

Removable
Storage Unit
518

Interface
520

Removable
Storage Unit
522

Communications
Interface
524

Remote device(s),
network(s),
entity(ies) 528

Communications Path 526

IMAGE OPTIMIZATIONS FOR MODERN WEB

TECHNICAL FIELD

Embodiments of the present disclosure relate to image optimization and content delivery, in particular to providing images based on a media format supported by a client device.

BACKGROUND

Media content delivery is an essential function of the modern internet. Client devices request media content from a content server, which hosts media content in one or more formats. However, this configuration is limited in that the media server must maintain each media content in each possible format, and client devices cannot access media content in a format that is not stored on the media server. In addition, client requests for media content in less compressed formats can create an unnecessary burden on the media server where the client device supports more compressed media formats. Furthermore, the media server may experience high traffic loads due to the number of client devices requesting media content, leading to slow transfer speeds and poor user experience for the client device.

BRIEF DESCRIPTION OF THE DRAWINGS/FIGURES

The accompanying drawings are incorporated herein and form a part of the specification.

In the drawings, reference numbers generally indicate identical or similar elements. Additionally, generally, the left-most digit(s) of a reference number identifies the drawing in which the reference number first appears.

DETAILED DESCRIPTION

Figure 1:
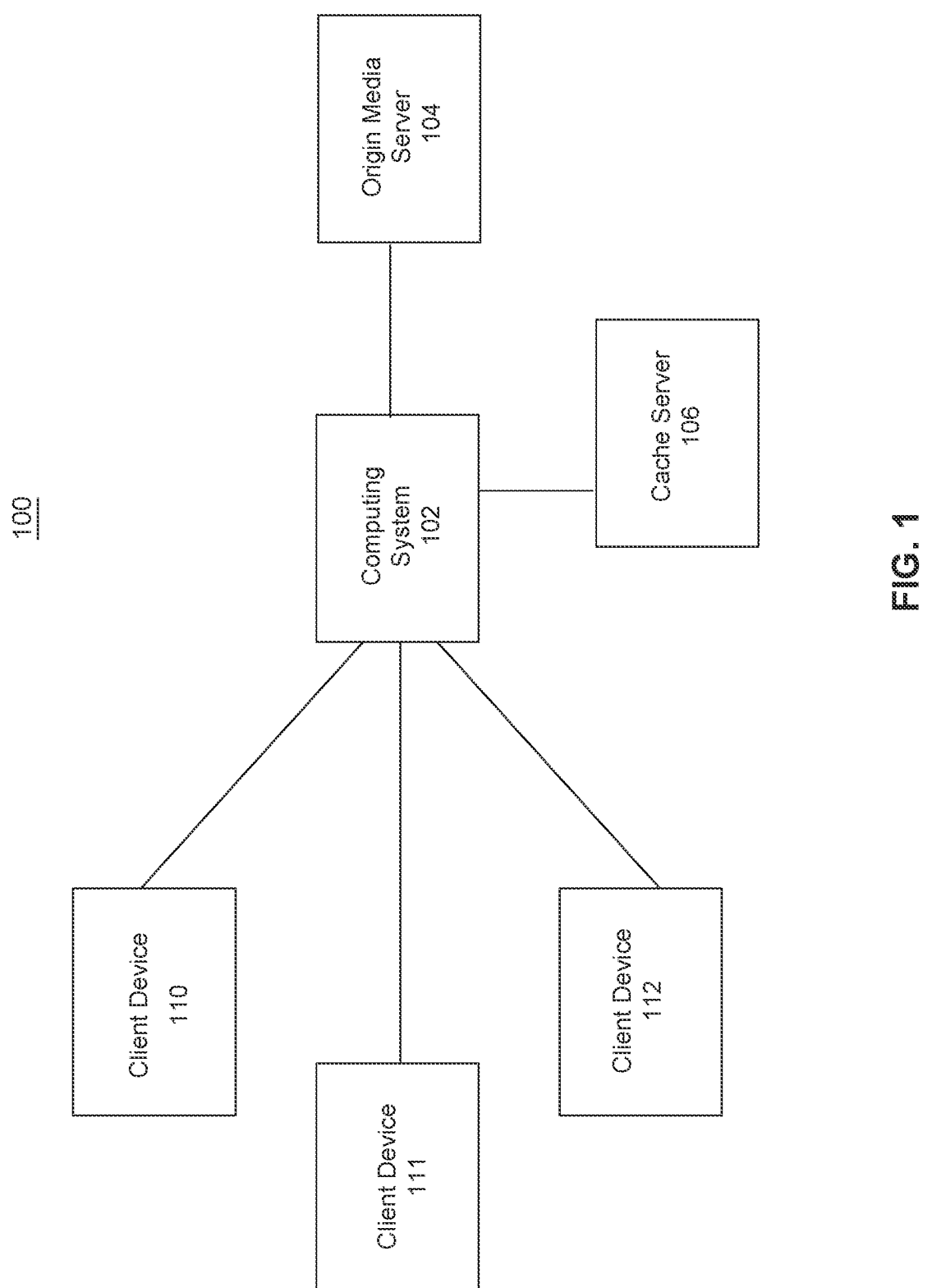
FIG. 1 illustrates a block diagram of a CDN according to some aspects.

Provided herein are a method, a computing system, a non-transitory computer readable medium, and/or combinations and sub-combinations thereof for optimizing media content delivery across a network connection.

In some aspects, a Content Delivery Network (CDN) provides a system for efficiently delivering formatted media content from a media server to one or more client devices. For example, a system according to the present disclosure may identify that a client device supports an AV1 Image File (AVIF) format, a WebP format, or the like. One of skill in the art will understand that these media formats achieve greater compression than media formats such as Joint Photographic Experts Group (JPEG) format, Portable Network Graphics (PNG), or the like. In some cases, formats such as AVIF, WebP, and the like may achieve up to 70% greater compression than formats such as JPEG, PNG, and the like, while maintaining identical or approximately equivalent visual quality of images between the different formats. That is, formats such as AVIF, WebP, and the like can achieve greater file compression than formats such as JPEG, PNG, and the like, without sacrificing image quality. Thus, according to some aspects, it may be desirable, when possible, to provide media content in a format such as AVIF, WebP, and the like, so that media content can be transferred more quickly to the requesting client device. This in turn can lead to improved user experience for the requesting client device, which experiences shorter load times, in particular for web pages containing multiple pieces of media content. However, it will also be appreciated that not all client devices support any or all of media formats such as AVIF, WebP, and the like. For this reason, a system according to the present disclosure may determine which, if any, such media formats are supported by the requesting client device, and may provide the requested media to the requesting client device in a supported format such as AVIF, WebP, and the like.

According to some aspects, a system may be configured to receive or intercept an original user request for media content from a client device, determine one or more media formats supported by the respective client device, and identify a formatted media content corresponding to the media format(s) supported by the client device. The system may then augment the original user request to generate a modified user request, which is transmitted to an origin media server. Upon receiving a response from the origin media server, the system may then determine if the response includes an error.

In some aspects, if the response does include an error, the system may be configured to reconstruct the original user request, retrieve media content from origin media server using the reconstructed original user request, convert the retrieved media content to a media format supported by the client device, and send the converted media content to the client device. In response to determining the response includes an error, the system may cache the converted media content for subsequent reuse.

In some aspects, if the response does not include an error, the system may send the response to the client device.

In some aspects, the original user request may comprise a Uniform Resource Locator (URL) that indicates the location of the requested media content. In some aspects, the formatted media content may be identified based on a destination URL of a media content having a format that is supported by the client device. A modified user request may be generated by replacing a URL in the original user request with the destination URL. In some aspects, the original user request may be reconstructed by replacing the destination URL with the URL in the original user request.

In some aspects, the system may be further configured to check a media cache for a formatted media content corresponding to the requested media content. If the formatted media corresponding to the requested media content is stored in the media cache, the system may send the formatted media content to the client device.

In some aspects, the one or more media formats supported by the client device may include one or more of an AVIF format and a WebP format. In some aspects, the retrieved media content may be converted from a JPEG format or a PNG format to one of an AVIF format and a WebP format.

In some aspects, the retrieved media content may be converted by resizing the media content based on a user profile. In some aspects, the converted media content may be sent to the client device by resizing and/or scaling the media content based on the requirements of the client device.

In some aspects, the system may be implemented as a non-transitory computer readable medium containing instructions that, when executed, cause a processor to execute processes corresponding to aspects of the invention. In some aspects, the system may be implemented as a computing system including a processor and a memory coupled to the processor storing a set of instructions that, when executed, cause the processor to execute processes corresponding to aspects of the invention. In some aspects, the computing system may include a communications interface configured to communicate with one or more client devices, one or more network entities, one or more servers that stores media content, and/or the internet using at least one communication path.

In some aspects, the system may include a computing system according to one or more aspects of the invention, at least one client device, and at least one server that stores media content.

FIG. 1 illustrates a block diagram of a Content Delivery Network (CDN) 100, according to some aspects. As shown in FIG. 1, CDN 100 may include one or more of computing system 102, one or more client devices 110-112, and one or more origin media servers 104. CDN 100 may also include one or more cache servers 106.

As shown in FIG. 1, computing system 102 may be disposed between one or more client devices 110, 111, and 112, and one or more origin media server(s) 104. Computing system 102 may also be in communication with one or more cache servers 106. For simplicity, only one origin media server 104 and only one cache server 106 are shown in FIG. 1, but it is to be understood that a plurality of origin media servers 104 and/or a plurality of cache servers 106 may be in communication with computing system 102.

Computing system 102 may be in communication with client devices 110-112 via one or more private or public networks. In some aspects, computing system 102 may communicate with client devices 110-112 via the internet. Similarly, computing system 102 may communicate with origin media server(s) 104 and/or cache server(s) via private and/or public networks and/or the internet. Computing system 102 may be implemented as a server or other computing system capable of receiving and sending requests for information. As discussed above, computing system 102 may receive user requests for media from client devices 110, 111, and 112, and retrieve media content from origin media server(s) 104 and/or cache server(s) 106.

Client devices 110, 111, and 112 may be implemented as a variety of personal computing devices. For example, client devices 110-112 may each constitute a personal computer (PC), a laptop computer, a portable computer, a mobile computing device, a personal digital assistant (PDA), a cellular phone or smart phone, a wearable device, or the like. In some aspects, client devices 110-112 may communicate with computing system 102 by using a wireless or cellular network or by using a wired connection. It is envisioned that client devices 110-112 may communicate via a combination of wireless and wired connections. For example, client device 110 may be a personal computer that communicates with computing system 102 via a broadband wired connection, and client device 111 may be smartphone that communicates with computing system 102 via a cellular connection. This example is merely illustrative, and the present disclosure should not be limited to such examples. In addition, while three client devices 110-112 are shown for simplicity, the present disclosure should not be limited to only three client devices, but encompasses any number of client devices in communication with computing system 102.

In some aspects, origin media server 104 may be implemented as a server or other computer system. Media content may be uploaded by users to origin media server 104. Origin media server 104 may communicate with various other computing devices, such as, for example, a terminal that allows a user to upload media content, a computing device used by a system administrator to maintain the media server, other media servers, and/or the internet.

Figure 2:
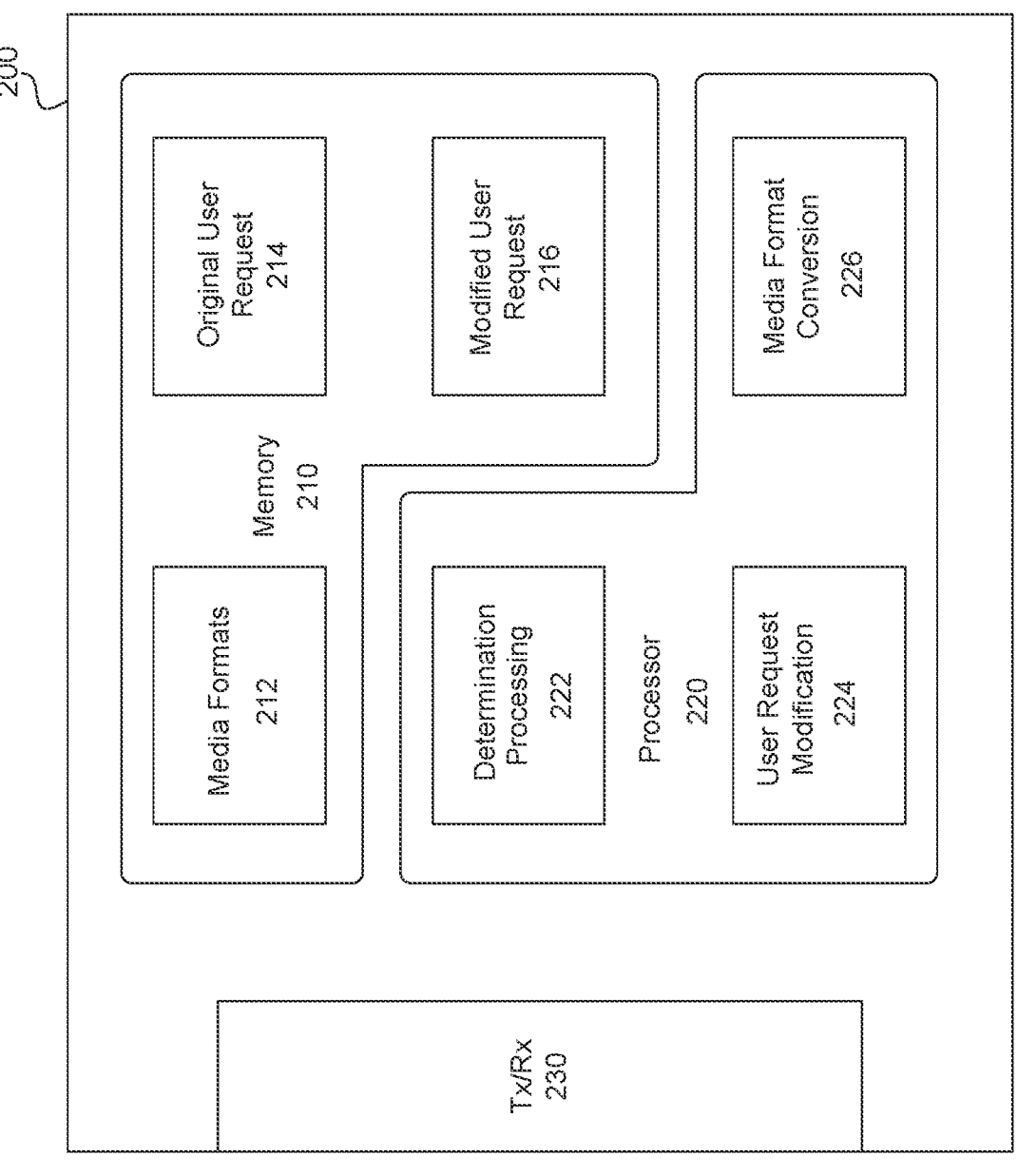
FIG. 2 illustrates a block diagram of a computing system according to some aspects.

FIG. 2 illustrates a block diagram of one exemplary embodiment of a system 200 according to some aspects. As shown in FIG. 2, system 200 may include a transceiver 230 for sending and receiving communications with external entities. The system may also include a memory 210 and a processor 220.

In some aspects, memory 210 may be constituted by one or more databases. The memory 210 may store various data to be used by system 200. As shown in FIG. 2, memory 210 may include media format(s) 212, original user request(s) 214, and modified user request(s) 216. In some aspects, media format(s) 212 may store formats that may be used for presenting media content, such as, for example, AVIF, WebP, or the like. Original user request(s) 214 may store or temporarily cache an original user request received by system 200, in particular in case the original user request is needed in response to an error message from the media server, as discussed below. Modified user request(s) 216 may store or temporarily cache modified user requests generated by system 200 based on the original user request(s) and the information regarding the requesting client device. In some aspects, the original user request(s) 214 may be obtained from one or more client devices.

System 200 may also include processor 220. In accordance with various aspects, processor 220 may include any number of processors and/or servers capable of carrying out the processing and functionality described herein. Processor 220 may include determination processing 222, which may process the received original user request(s) for media content and identifies media formats that are supported by the client device. Processor 220 may include user request modification processing 224, which may modify an original user request based on an identified media format supported by the requesting client device to generate a modified user request for media content. Processor 220 may further include media format conversion processing 226, which may convert a retrieved media content from an original format to a format supported by the requesting client device.

Figure 3:
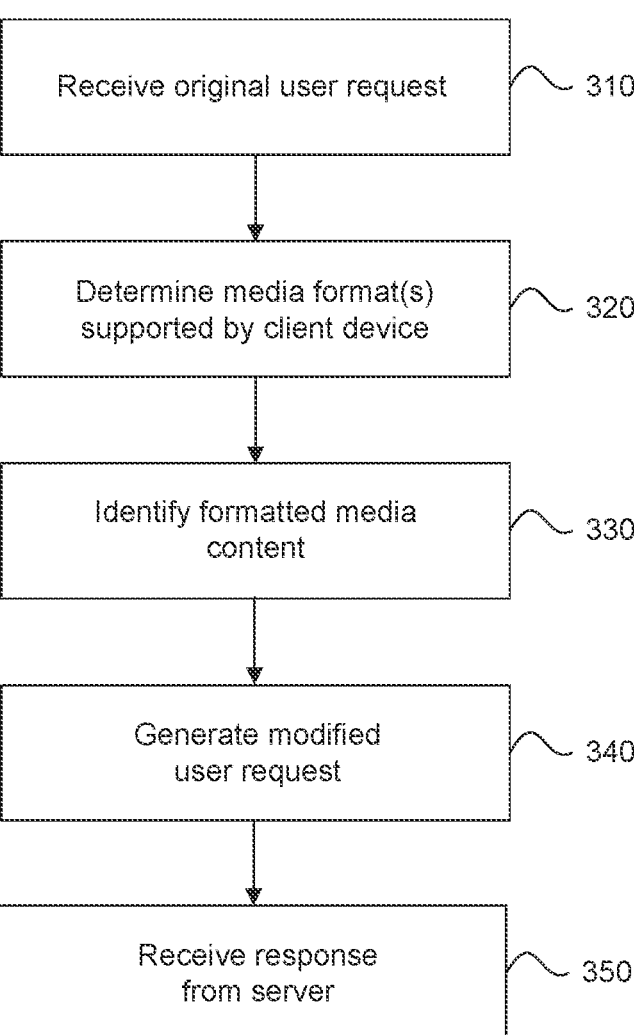
FIG. 3 illustrates a flowchart diagram of a method of operation according to some aspects.

FIG. 3 illustrates a flowchart depicting a process 300 for operating a system according to some aspects. As shown in FIG. 3, process 300 commences at step 310 with the system, such as, for example, computing system 102 (in FIG. 1), receiving an original user request for media content from a client device. For example, computing system 102 may receive an original user request for media content from one or more of client device(s) 110, 111, and 112. In some aspects, the original user request may be sent from a client device directly to the system. In some aspects, the system may receive the original user request as it is sent from an edge or location-based server to a media server. In some aspects, the original user request may be sent from a client device directly to a media server, in which case the system may intercept (receive) the original user request before it is received by the media server.

In some aspects, the user request for media content may include a Uniform Resource Locator (URL) that indicates the requested media content. For example, the URL may indicate a specific address from which the media content is to be retrieved.

According to some aspects, at step 320, after receiving the original user request for media content, the system may determine one or more media formats supported by the requesting client device. In one exemplary embodiment, at step 320, after receiving an original user request from one or more client device(s) 110, 111, and 112, computing system 102 may analyze the original user request. The system may analyze the original user request for media content from the client device as well as information related to the client device itself. In some aspects, the system may analyze the original user request for media content to determine a format of the requested media content. The system may make this determination, for example, by analyzing a URL provided in the original user request for media content. The information of the client device that is analyzed by the system may include one or more of a bandwidth of the requesting client device, a browser used by the requesting client device, system specification(s) of the requesting client device such as a processor, a memory, a BIOS setting, or the like.

In some aspects, based on the information about the client device and the analysis of the original user request for media content from step 320, the system may at step 330 identify one or more media formats supported by the requesting client device. As discussed above, in some aspects, the system may determine if the requesting client device supports one or more media formats such as AVIF, WebP, and the like. For example, the system may determine that the requesting client device has a large enough bandwidth and uses a browser that supports AVIF, so the system may determine that the requesting client device supports AVIF. In some aspects, at step 330, the system may identify a destination URL of a media content having a format that is supported by the client device. In one exemplary embodiment, determination processing 222 in processor 220 in system 200 (in FIG. 2) may analyze an original user request for media content that is received by transceiver 230 by determining a URL contained in the original user request for media content.

Based on the determination in step 330, the system may at step 340 generate a modified user request to be sent to the media server. For example, the system may augment the original user request for media content so that the modified user request includes a formatted media content according to a media format supported by the client device. In some aspects, at step 340, the system may replace a URL in the original user request with the destination URL identified in step 330. In one exemplary embodiment, user request modification processing 224 may generate a modified user request for media content by replacing a URL contained in the original user request for media content with a destination URL identified in step 330. In some aspects, the system may augment the original user request for media content by storing the original user request for media content and creating a new request for media content containing the destination URL identified in step 330.

As one example of the above processes, computing system 102 may receive an original user request, from a requesting client device 110, for media provided in a PNG format. Determination processing 222 in processor 220 of computing system 102 may analyze the original user request as well as information about the requesting client device to determine that the requesting client device supports a WebP media format. Based on this determination, computing system 102 may identify a URL of a media content that is in the WebP media format. Then, user request modification processing 224 in processor 220 of computing system 102 may store the original user request for media content in original user request 214 of memory 210 and generate a modified user request by augmenting the original user request to include the URL of the WebP media format corresponding to the requested media content. As discussed above, providing media formatted in the WebP format instead of the PNG format may lead to substantially reduced loading times by achieving substantially greater file compression without sacrificing image quality. Thus, in some aspects, the system may prioritize providing WebP formatted media content, where possible, over PNG formatted media content.

The above example is merely illustrative, and the present disclosure should not be limited to the above example. In some aspects, the system may attempt to provide media in any format such as AVIF, WebP, and the like. In some aspects, the system may prioritize one particular format from among formats such as AVIF, WebP, and the like. In some aspects, the system may provide a priority list of media formats. In one example, the system may prioritize AVIF over WebP, JPEG, PNG, and other media formats. In another example, the system may place the same level of priority among AVIF, WebP, and similar media formats.

In some aspects, after generating a modified user request for media content, the system may send the modified user request to the media server. The system may also cache the original user request for media content for subsequent retrieval. For example, the original user request may be placed into a memory cache or sent to a cache server.

Upon receiving the modified user request for media content, the media server may determine if the requested media content is available in the requested format. As an example, origin media server 104 may receive the modified user request for media content from computing system 102. In response to receiving the modified request, origin media server 104 may check if the requested media content in the requested media format is available at origin media server 104 (or at a location accessible by origin media server 104).

In some aspects, a user may upload media content to the media server in a variety of media formats. In some aspects, a user may upload media content to the media server in a single media format. The media server may convert an uploaded media content to various media formats. However, it should be appreciated that storing a particular media content in a variety of formats at the media server may result in increased memory requirements and slower performance by the media server. Accordingly, the media server may store a particular media content in a limited number, or even in only one, media format.

At step 350, in response to checking by the media server for the requested media content, the media server sends a response to the modified user request. If the media server finds the requested media content in the requested media format, the media server may at step 350 send the requested media content to the system. Otherwise, the media server at step 350 may send a response to the system that includes an error indicating that the requested media content is not available in the requested media format.

Figure 4:
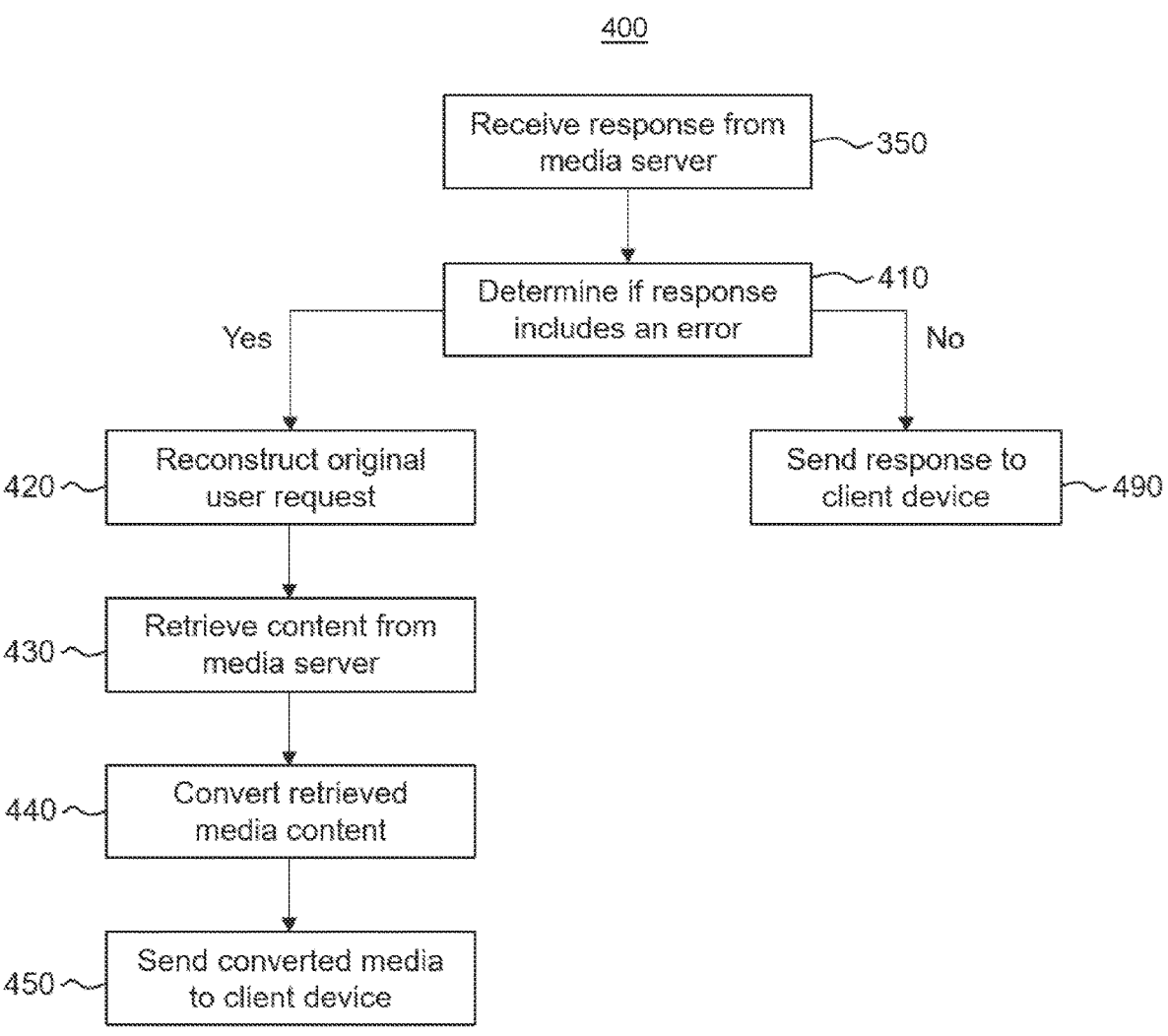
FIG. 4 illustrates a flowchart diagram of a method of operation according to some aspects.

FIG. 4 illustrates a flowchart depicting a process 400 for operating a system according to some aspects. As shown in FIG. 4, process 400 commences with step 350 from process 300, shown in FIG. 3, with the system receiving a response from the media server. As one example, computing system 102 may receive a response from origin media server 104. As discussed above, the response from the media server may include the requested media content or it may include an error.

Upon receiving the response from the media server, the system may at step 410 determine if the response from the media server includes an error. For example, if origin media server 104 is unable to find the requested media content in the requested media format, it may send a message to computing system 102 indicating that the media content or the URL in the request for media content cannot be found. In some aspects, if the response from the media server does not contain any media files, the system may determine that the response includes an error. In some aspects, the system may compare any media received in the response to the media requested in the modified user request, to determine if the received media matches the format requested. If the received media has a format that is different from the requested media format, the system may determine that the response includes an error. If the response from the media server includes an error, the process proceeds to steps 420-450 as the system converts the media content to a different media format, as discussed below. If the response from the media server does not include an error, the process may proceed to step 490, wherein the response from the media server may be sent by the system to the requesting client device.

Similar to receiving the original user request for media content, the system may receive the response directly from the media server, or after passing through an edge or location-based server. In some aspects, the media server may send the response directly to the system. In some aspects, the media server may send the response directly to the requesting client device, in which case the system may intercept (receive) the response before it is received by the requesting client device.

In some aspects, beginning at step 420, after receiving a response from the media server that includes an error, the system may convert the requested media content to a different media format that is supported by the requesting client device.

At step 420, the system may reconstruct the original user request by, for example, retrieving the original user request from cache. In some aspects, at step 420, the system may replace the destination URL provided in the modified user request at step 340 with the URL provided in the original user request for media content. In one exemplary embodiment, at step 420, the system may retrieve the original user request for media content from original user request 214 in memory 210. User request modification processing 224 may then use the retrieved original user request for media content to reconstruct the original user request for media content. For example, user request modification processing 224 may replace the URL in modified user request for media content with the URL in the original user request for media content. In some aspects, the original user request for media content may be retrieved from original user request storage 214 and sent directly to media server.

Using the reconstructed original user request from step 420, the system may at step 430 retrieve the requested media content from the media server in the originally requested media format.

The system may then at step 440 convert the retrieved media content to a different media format that is supported by the requesting client device. For example, media format conversion processing 226 in processor 220 may receive the retrieved media content and convert the retrieved media content to the desired media format. As one example, media format conversion processing 226 in processor 220 may convert a retrieved PNG media file into a WebP media file. In some aspects, at step 440, the system may also resize the media content based on a profile of a user that uploaded the media content. In some aspects, the system may resize, scale, crop, etc., the media content based on settings and/or requirements of the requesting client device.

In one example of the above processes, computing system 102 may receive a response from origin media server 104 that indicates a requested media content could not be found in the requested media format. Based on this error, computing system 102 may reconstruct the original user request by retrieving the original user request from original user request storage 214, and may use the reconstructed original user request to retrieve the media content in the originally requested media format. As an example, computing system 102 may use the reconstructed original user request to retrieve the requested media content in a PNG format. Media format conversion processing 226 of processor 220 may then convert the PNG formatted media content into, for example, an AVIF format that is supported by the requesting client device and that has a higher priority in the system.

After converting the media content into a supported media format, the system may at step 450 send the converted media content to the requesting client device. According to some aspects, the system may cache the converted media content for subsequent reuse. For example, the system may provide the converted media content to another client device that requests the same media content and that supports the media format of the converted media content. In other cases, the system may also provide the cached converted media content again to the same client device in response to a new request from the client device for the same media content.

The present disclosure is not limited to the above described steps, and more or fewer steps may be performed without departing from the present disclosure. For example, any of steps 310-490 may be combined or rearranged based on the knowledge of one of ordinary skill in the art to optimize the system. In some aspects, additional steps may also be performed. For example, in some aspects, the method may include steps of the system checking a media cache for a formatted media content corresponding to the requested media content, and, in response to the formatted media corresponding to the requested media being stored in the media cache, the system may send the formatted media content to the client device. Such steps could be readily implemented at various points in the process set forth in FIGS. 3 and 4. For example, in some aspects, such checking of a cache may not take place at least until the system caches at least one formatted media content (e.g., after step 450). In other aspects, such checking of a cache may take place each time the system receives an original user request for media content (e.g., at step 310) or after determining the media formats supported by the client device (e.g., at step 320). In addition, such checking of a cache could further be implemented in some aspects after determining that the response from the media server includes an error (e.g., at step 410). A skilled artisan will appreciate that such a media cache can be implemented in the present disclosure in a number of ways without departing from the present disclosure.

Figure 5:
FIG. 5 illustrates a computing system for implementing some aspects of the disclosure or portion(s) thereof.

Various embodiments of the system described herein could be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506. Communication infrastructure or bus 506 may be configured to communicate with one or more client devices, one or more network entities, one or more servers that stores media content, and/or the internet using at least one communication path.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
receiving, by a computing system from a client device, an original user request to retrieve media content from a server;
determining, by the computing system, one or more media formats supported by the client device;
identifying, by the computing system, a formatted media content corresponding to a media format of the one or more media formats supported by the client device;
generating, by the computing system, a modified user request based on augmenting the original user request to include the formatted media content;
forwarding, by the computing system, the modified user request to the server;
receiving, by the computing system, a response to the modified user request from the server; and
in response to determining, by the computing system, that the response includes an error:
reconstructing, by the computing system, the original user request;
forwarding, by the computing system, the reconstructed original user request to the server;
receiving, by the computing system, media content retrieved by the server using the reconstructed original user request;
converting, by the computing system, the retrieved media content to one of the one or more media formats supported by the client device; and
sending, by the computing system, the converted media content to the client device.

2. The method of claim 1, further comprising:
in response to determining the response from the server does not include an error, sending, by the computing system, the response to the client device.

3. The method of claim 1, wherein receiving the original user request comprises receiving a Uniform Resource Locator (URL) that indicates the requested media content.

4. The method of claim 1, wherein determining the one or more media formats supported by the client device comprises determining if the client device supports one or more of an AV1 Image File (AVIF) format and a WebP format.

5. The method of claim 1, wherein:
identifying the formatted media content comprises identifying a destination Uniform Resource Locator (URL) of a media content having a format that is supported by the client device; and
generating the modified user request comprises replacing a URL in the original user request with the destination URL.

6. The method of claim 5, wherein reconstructing the original user request comprises replacing the destination URL with the URL in the original user request.

7. The method of claim 1, wherein converting the retrieved media content comprises converting the retrieved media content from a Joint Photographic Experts Group (JPEG) format or a Portable Network Graphics (PNG) format to one of an AV1 Image File (AVIF) format and a WebP format.

8. The method of claim 1, wherein, in response to determining the response includes the error, the method further comprises caching, by the computing system, the converted media content for subsequent reuse.

9. The method of claim 1, further comprising:
checking, by the computing system, a media cache for a formatted media content corresponding to the requested media content; and
in response to the formatted media content corresponding to the requested media content being stored in the media cache, sending, by the computing system, the formatted media content to the client device.

10. The method of claim 1, wherein converting the retrieved media content comprises resizing the media content based on a user profile.

11. The method of claim 1, wherein sending the converted media to the client device comprises resizing and/or scaling the media content based on requirements of the client device.

12. A non-transitory computer readable medium containing instructions that, when executed, cause a processor of a computing system to execute processes comprising:
receiving, by the computing system from a client device, an original user request to retrieve media content from a server;
determining, by the computing system, one or more media formats supported by the client device;
identifying, by the computing system, a formatted media content corresponding to a media format of the one or more media formats supported by the client device;
generating, by the computing system, a modified user request based on augmenting the original user request to include the formatted media content;
forwarding, by the computing system, the modified user request to the server;
receiving, by the computing system, a response to the modified user request from the server; and
in response to determining, by the computing system, that the response includes an error:

reconstructing, by the computing system, the original user request;

forwarding, by the computing system, the reconstructed original user request to the server;

receiving, by the computing system, media content retrieved by the server using the reconstructed original user request;

converting, by the computing system, the retrieved media content to one of the one or more media formats supported by the client device; and sending, by the computing system, the converted media content to the client device.

13. The non-transitory computer readable medium according to claim 12, wherein in response to determining the response from the server does not include an error, sending, by the computer system, the response to the client device.

14. The non-transitory computer readable medium according to claim 12, wherein:

determining the one or more media formats supported by the client device comprises determining if the client device supports one or more of an AV1 Image File (AVIF) format and a WebP format, and converting the retrieved media content comprises converting the retrieved media content from a Joint Photographic Experts Group (JPEG) format or a Portable Network Graphics (PNG) format to one of the AV1 Image File (AVIF) format and the WebP format.

15. The non-transitory computer readable medium according to claim 12, wherein, identifying the formatted media content comprises identifying a destination URL of a media content having a format that is supported by the client device; and generating the modified user request comprises replacing a URL in the original user request with the destination URL.

16. The non-transitory computer readable medium according to claim 12, wherein in response to determining the response includes the error, the instructions further cause the processor to execute a process of caching the converted media content for subsequent reuse.

17. The non-transitory computer readable medium according to claim 12, wherein the instructions further cause the processor to execute processes of:

checking a media cache for a formatted media content corresponding to the requested media content; and in response to the formatted media content corresponding to the requested media content being stored in the media cache, sending the formatted media content to the client device.

18. A computing system comprising:

a processor; and a memory coupled to the processor and storing a set of instructions that, when executed, cause the processor to execute processes of:

receiving, by the computing system from a client device, an original user request to retrieve media content from a server;

determining, by the computing system, one or more media formats supported by the client device;

identifying, by the computing system, a formatted media content corresponding to a media format of the one or more media formats supported by the client device;

generating, by the computing system, a modified user request based on augmenting the original user request to include the formatted media content;

forwarding, by the computing system, the modified user request to the server;

receiving, by the computing system, a response to the modified user request from the server; and in response to determining, by the computing system, that the response includes an error:

reconstructing, by the computing system, the original user request;

forwarding, by the computing system, the reconstructed original user request to the server;

receiving, by the computing system, media content retrieved by the server using the reconstructed original user request;

converting, by the computing system, the retrieved media content to one of the one or more media formats supported by the client device; and sending, by the computing system, the converted media content to the client device.

19. A Content Delivery Network (CDN) comprising:

the computing system according to claim 18;

at least one client device; and at least one server configured to store media content.

20. The computing system of claim 18, wherein, the computing system receives the original user request from the client device by intercepting the original user request as it is sent from the client device to the server.

* * * * *